United States Patent [19]

Miura et al.

[11] Patent Number: 4,510,273

[45] Date of Patent: Apr. 9, 1985

[54] THIXOTROPIC AGENT

[75] Inventors: Yoshikazu Miura, Ichihara; Koji Horimoto, Iwakuni; Takenori Sumida, Tokyo, all of Japan

[73] Assignee: Mitsui Petrochemical Industries, Ltd., Tokyo, Japan

[21] Appl. No.: 446,354

[22] Filed: Dec. 2, 1982

Related U.S. Application Data

[63] Continuation of Ser. No. 308,908, Oct. 5, 1981, abandoned, which is a continuation-in-part of Ser. No. 205,159, Nov. 10, 1980, abandoned.

[30] Foreign Application Priority Data

Nov. 8, 1979 [JP] Japan ................................ 54-144834

[51] Int. Cl.³ ............................................. C08K 3/20
[52] U.S. Cl. .................................... 523/406; 523/450; 523/526; 524/570; 524/579; 524/582; 524/585; 525/168

[58] Field of Search ...................... 524/582, 570, 579, 524/585; 523/406, 450, 526; 525/168

[56] References Cited

U.S. PATENT DOCUMENTS 3,743,272 7/1973 Nowotny et al. .................... 528/480
3,743,570 7/1973 Yang et al. ........................ 162/157.5
3,862,069 1/1975 Cruz, Jr. et al. .................... 524/582

FOREIGN PATENT DOCUMENTS 2426188 12/1975 Fed. Rep. of Germany .
52-19742 2/1977 Japan ................................... 524/582

Primary Examiner—Joseph L. Schofer
Assistant Examiner—N. Sarofim
Attorney, Agent, or Firm—Armstrong, Nikaido, Marmelstein & Kubovcik

[57] ABSTRACT

A polyolefin fiber synthetic pulp having a specific Drainage Factor, Floating Factor, average diameter and Classified Fiber Length serves as an effective thixotropic agent.

5 Claims, 1 Drawing Figure

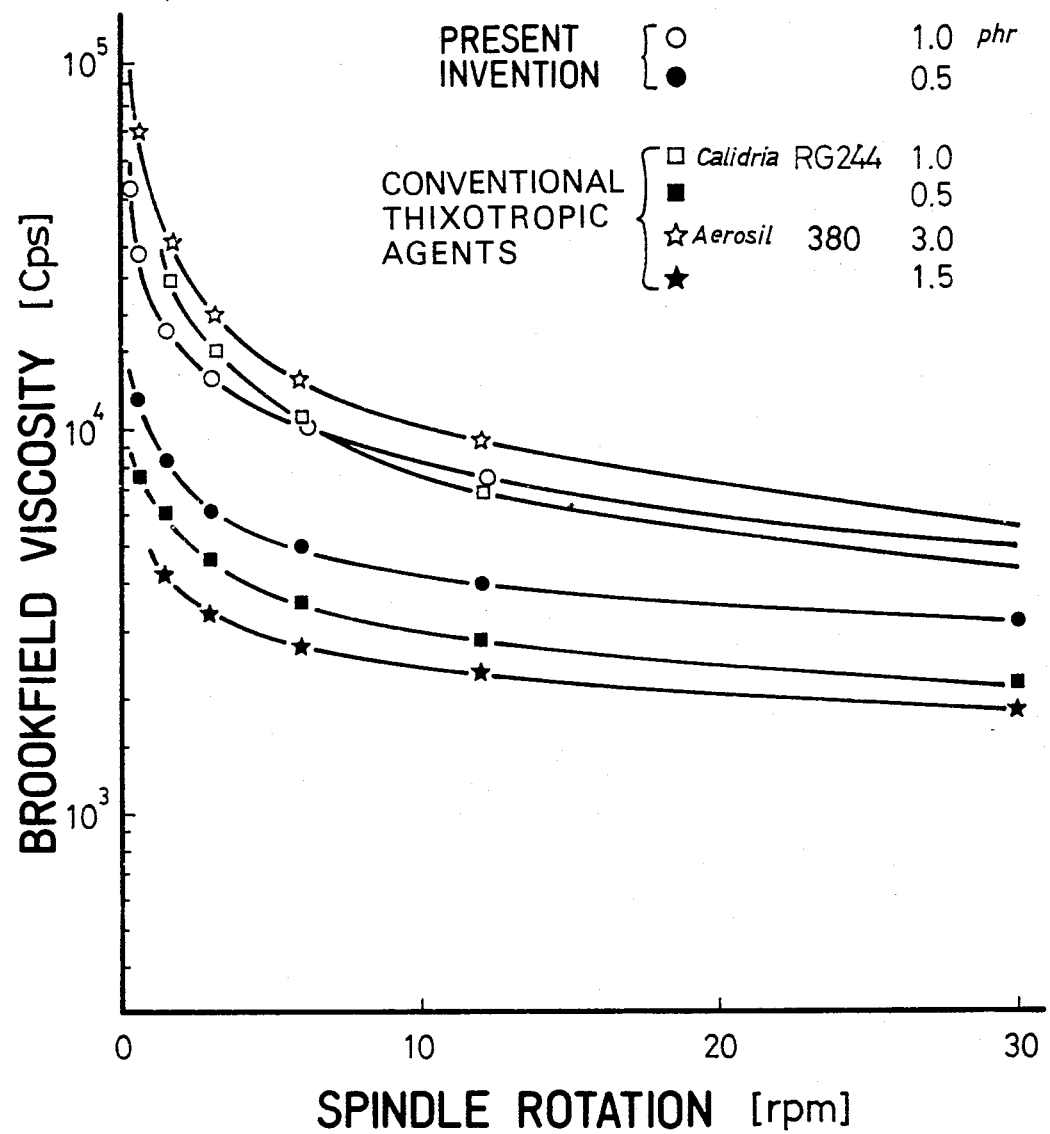

THIXOTROPIC AGENT

This application is a continuation application of U.S. Ser. No. 308,908, filed Oct. 5, 1981, now abandoned, which is a continuation-in-part application of U.S. Ser. No. 205,159, filed Nov. 10, 1980, now abandoned.

BACKGROUND OF THE INVENTION

1. Field of the Invention

The present invention relates to a novel thixotropic agent.

2. State of the Art

It is desirable that some kinds of compositions used in the form of a highly viscous liquid or a paste such as paints, sealing material or caulking material generally called "patching compound" and adhesives have fluidity or plasticity higher at the time of being applied, but lower after the application.

Such a characteristic can be realized by providing a thixotropic property to the compositions, i.e., the property of exhibiting a high fluidity during deformation by force of a sprayer, roller or trowel, but losing the fluidity when left at rest.

Hitherto, as a thixotropic agent, fine powder silica has a wide range of use. It is, however, expensive. Bentonite and starch are also used. As far as performance is concerned, asbestos is an excellent thixotropic agent, and particularly, specially treated asbestos has been used by preference because of its remarkable effect. However, as the objectionable influences of asbestos on human health became clear, use of asbestos has been put under control which is getting more strict.

German Patent Disclosure No. 2,426,188 describes use of short polyolefin fibers and fibers having a high fibrillation level as a thickening agent for aqueous painting, coating and layering materials.

There has been a great demand for a thixotropic agent which is useful for not only aqueous materials but also oily or organic material, e.g., polyester resin, and further, which is applicable for use with a spray gun without any trouble such as plugging of spray nozzles.

SUMMARY OF THE INVENTION

The object of the present invention is to provide a novel thixotropic agent, which is not so expensive and is harmless, and therefore, can be substituted for the above-noted fine powder silica and asbestos.

The invention is based on our discovery that a polyolefin fiber synthetic pulp having specific characteristics serves as a satisfactory thixotropic agent.

DRAWING

The attached single drawing is a graph showing changes of viscosity of a polyester liquid resin, in which the thixotropic agent of the invention is used, in comparison with the conventional agents.

DESCRIPTION OF PREFERRED EMBODIMENTS

The polyolefin fiber synthetic pulp used in the present invention should have D.F. or "Drainage Factor" of 0.03 to 8 second/gramm and F.F. or "Floating Factor" of 100 ml or less.

The D.F. is measured by the method standardized in TAPPI-T 221. The F.F. is given by repulping a sample of 4 g in water to form a suspension of 800 ml, pouring the suspension into a measuring cylinder of 1 liter to let stand alone, and 2 minutes after, measuring the volume of the water layer which appears due to floating up of the specimen in blocks of 5 ml.

The term "Polyolefin" means polyethylene, polypropylene, and copolymers of ethylene with an alpha-olefin such as ethylene/propylene copolymer, ethylene/1-butene copolymer and ethylene/4-methyl-1-pentene copolymer.

The above noted limits of the D.F. are chosen for the purpose of providing excellent thixotropic property. The synthetic pulp having a D.F. outside this range does not give sufficient effect.

In the case where the object to which the present thixotropic agent is added is an aqueous system, the value of F.F. of the agent can be up to 100 ml. The F.F. is preferably as low as possible.

Preferable average diameter of the polyolefin fiber was found to be 0.1 to 10 micron. The length of the fiber does not have decisive influence, though a relatively long fiber seems to be better in giving thixotropic property. In case of application by spraying the composition containing the present thixotropic agent, relatively short fiber having C.F.L. or "Classified Fiber Length" of 0.01 to 0.2 mm, preferably 0.05 to 0.18 mm, will be suitable because of little risk of plugging spray nozzles.

The amount of polyolefin pulp or thixotropic agent incorporated into a material to control the fluidity or plasticity of the material depends on the material and is generally 0.05 to 8 phr, preferably 0.2 to 3 phr. The term "phr" means parts per hundred parts of resin or parts by weight of the agent added to 100 parts by weight of the material or liquid of which the thixotropy is to be increased. When the material or liquid is an aqueous medium the "r" of "phr" is interpreted as the weight of the liquid or material.

Preparation of the polyolefin synthetic pulp having the above-noted particular properties and fiber form can be carried out in accordance with the methods known to the art. For example, in case of using polyethylene, it is recommended to choose a material of a molecular weight corresponding to a Melt Index of 5 to hundreds, which is dissolved in a solvent under heating, to add a hydrophilic substance such as PVA (poly vinyl alcohol) to the solution, then, to flash the solution into the water so as to precipitate the polyethylene under strong shearing force, and, if necessary, to treat the precipitated pulp with a refiner. The properties and the fiber form can vary in wide ranges by changing conditions of the preparation.

The thixotropic agent of the present invention using the polyolefin synthetic pulp can be incorporated in any object after added with, or simultaneously with various additives as occasion demands.

The objects to which the present thixotropic agent is added to control the fluidity or the plasticity extend over a so wide field that it possible to use the present agent in all the fields in which the above-mentioned conventional thixotropic agents are effective. In addition to the aforesaid paints, sealing or caulking material and adhesives, plaster for wall and putty are included. Also, application to unsaturated polyester resin for producing FRP products is an important area of using the present agent. Selection of the characteristics of the agent appropriate for the use can realize the desired thixotorpic property, resulting in wider scope of its application.

As seen from the examples shown below, the thixotropic agent of the present invention exhibits the same performance level as that of the same amount of a highly refind asbestos (weight) and that of three times the amount of a fine powder silica.

Compared to the expensive fine powder silica, the price of the unit weight of the polyolefin fiber synthetic pulp is only a few-tenths thereof. Moreover, the actual does is smaller and, therefore, the polyolefine synthetic pulp is highly advantageous over the fine powder silica with respect to cost. The present thixotropic agent is also competitive to asbestos both in the performance and the cost, and is free from the above-described problem of harm to the human body, as well as the restriction inevitable to a natural resource. Further, because the specific gravity of the polyolefin is lower than those of the conventional thixotropic agents, the composition to which the present agent is incorporated will be lighter in weight.

EXAMPLE I

To an o-phthalic acid-based unsaturated polyester resin, "Polyset 2125 G" produced by Hitachi Kasei K.K., a polyethylene-based synthetic pulp having D.F. of 2.5 second/gramm, F.F. of 50 ml, average fiber diameter of 5 micron and C.F.L. of 0.1 mm was added in the amount of 0.5 phr or 1.0 phr. The mixtures were then stirred with a high speed stirrer for 3 minutes.

For the purpose of determining thixotropic property, a Brookfield viscosimeter, "Vismetron" manufactured by Seiki Kagaku Kogyo was employed to measure the changing viscosity while the rate of rotation of the rotor increased at room temperature.

For a comparative study, specimens were prepared by adding to the above unsaturated polyester resin a conventional thixotropic agent, fine powder silica, "Aerosil 380" produced by Degussa in the amount of 1.5 phr or 3.0 phr, and a high performance thixotropic agent, modified asbestos, "Calidria RG-244" produced by UCC in the amount of 0.5 phr or 3.0 phr, which specimens were also subjected to the same measurement of viscosity.

The results are shown in the graph of the Drawing. The data clearly prove the effect of the present thixotropic agent comprising the polyolefin synthetic pulp.

EXAMPLE II

To an i-phthalic acid-based unsaturated polyester resin, "Polyset 660", polyethylene-based synthetic pulp having D.F. of 5 second/gramm, F.F. of 5 ml, average fiber diameter of 3 micron and C.F.L. of 0.1 mm was added in the amounts of 0.2, 0.5, 1 or 2 phr, after being setted with styrene of ten times weight.

The compositions were mixed under high speed stirring for 10 minutes, followed by low speed stirring for 2 minutes to form homogeneous mixtures.

While the rate of rotation of the Brookfield viscosimeter was changing, the changing viscosity of the compositions was measured at room temperature as described in Example I.

Also, the fine powder silica, "Aerosil 380" and the modified asbestos, "Calidria RG-244" were used to prepare thixotropic compositions, which were subjected to the measurement of viscosity with the rotary viscosimeter.

The results are given in Table I.

The "Thixo Indes" in the Table is defined as the ratio of the viscosity measured at 6 rpm to the viscosity at 60 rpm. The larger the Index is, the greater the thixotropy.

A thixo index around 2 to 3 is suitable to a liquid resin for FRP products. The data in Table I teaches that the polyolefin synthetic pulp is satisfactory as the thixotropic agent for this purpose.

TABLE I

| Amount of Addition (phr) | Viscosities at different Rotation of Rotor (rpm) | | | | Thixo Index |
|---|---|---|---|---|---|
| | 6 | 12 | 30 | 60 | |
| Polyethylene synthetic pulp | | | | | |
| 0.2 | 660 | 670 | 660 | 652 | 1.01 |
| 0.5 | 920 | 810 | 716 | 656 | 1.40 |
| 1 | 1840 | 1390 | 1000 | 812 | 2.27 |
| 2 | 4720 | 3200 | 1984 | 1390 | 3.40 |
| Aerosil 380 | | | | | |
| 0.5 | 470 | 475 | 479 | 478 | 0.98 |
| 1 | 370 | 368 | 355 | 349 | 1.06 |
| 2 | 475 | 382 | 310 | 274 | 1.73 |
| Calidria RG-244 | | | | | |
| 0.2 | 640 | 640 | 640 | 630 | 1.02 |
| 0.5 | 780 | 740 | 676 | 640 | 1.22 |
| 1 | 1480 | 1130 | 816 | 670 | 2.21 |
| 2 | 4620 | 2870 | 1624 | 1122 | 4.12 |

Viscosity is given in "cps".

EXAMPLE III

Stability of the effect of the thixotropic agent according to the present invention was examined over a long period of time.

To an unsaturated polyester resin, "Ester XE 8032" produced by Mitsui Toatsu Kagaku Kogyo, the polyethylene synthetic pump used in Example II was added in the amount of 2 phr in the same mixing manner as Example II.

Measurements were made at the room temperature on the viscosity immediately after the mixing, and after standing at the ambient temperature for 4 months. For the purpose of comparison, the same examination was conducted on the mixture containing 2 phr of the fine powder silica, "Aerosil 380".

The experimental reults are in Table II. Decrease of the Thixo Index after elapse of 4 months was found to exceed 15% in the conventional art, while in the present invention, only 1.6% decrease was observed. Table II indicates that the effect of the polyethylene synthetic pulp as the thixotropic agent is stable over a long period of time.

TABLE II

| Thixotropic Agents | Viscosity at low and high rotation (rpm) | | Thixo Index |
|---|---|---|---|
| | 6 | 60 | |
| Polyethylene synthetic pulp | | | |
| Just after addition | 960 | 383 | 2.51 |
| 4 months after | 960 | 389 | 2.47 |
| Aerosil 380 | | | |
| Just after addition | 1165 | 428 | 2.72 |
| 4 months after | 1025 | 446 | 2.30 |

Viscosity is given in "cps".

EXAMPLE IV

Using two kinds of synthetic pulp, (A) having a CFL of 0.08 mm in accordance with the present invention, and (B) having a CFL of 0.5 mm, which is described as preferable in the cited German Patent Disclosure No. 2,426,188, the thixotropic effect for an unsaturated polyester resin solution was determined by preparing the following compounds:

| | |
|---|---|
| "Polyset 660" | 100 parts by weight |
| synthetic pulp (A) or (B) | 1 parts by weight |
| styrene monomer | 10 parts by weight |
| 4% cobalt naphthenate | 0.5 parts by weight |
| 55% MEK peroxide | 1.0 parts by weight | and by coating the resulting compounds on glass plates with a bar-coater to evaluate appearance of the coated compounds after their setting.

In case where the pulp (A) was used, the coated surface was smooth without unevenness. On the other hand, the run using the pulp (B) resulted in formation of many fiber-particles of diameters 1 to 2 mm, and significant unevenness was observed.

EXAMPLE V

The above two kinds of synthetic pulp (A) and (B) were used to prepare the following two compounds (X) and (Y). The amounts of styrene monomer were chosen so that the two compounds have approximately the same viscosities.

| | X | Y |
|---|---|---|
| "Polyset 660" | 100 parts by wt. | 100 parts by wt. |
| synthetic pulp | (A) 1 parts by wt. | (B) 1 parts by wt. |
| Styrene monomer | 15 parts by wt. | 20 parts by wt. |
| 4% cobalt naphthenate | 0.5 parts by wt. | 0.5 parts by wt. |
| 55% MEK peroxide | 1.0 parts by wt. | 1.0 parts by wt. |
| Viscosity | 480 cps part by wt. | 470 cps parts by wt. |

(The viscosity was measured with "B" type viscometer at 25° C. 60 rpm.)

These unsaturated polyester resin compounds were continuously sprayed through a spray gun for high-pressure and high-viscosity use of the type "W-60Z" (nozzle diameter: 1.2 mm) made by Iwata Coating Machines.

The compound (X) was sprayable continuously for a long time. On the contrary, the spray test with the compound (B) was interrupted by plugging of spray nozzle 30 seconds after beginning. In the nozzle, an agglomerate of the synthetic pulp was found.

EXAMPLE VI

A synthetic pulp of a polyolefin fiber according to the present invention with DF of 3, FF of 20, average diameter of 3 micron and CFL of 0.1 mm was mixed in asphalt, epoxy-resin and latex of ethylene-vinyl acetate copolymer specified below in the amount of 1 phr.

| Composition (wt. %) | | |
|---|---|---|
| Asphalt: | cut-back asphalt | 83 |
| | aluminum silicate | 2 |
| | aluminum paste | 15 |
| Epoxy-resin: | epoxy-resin | 20 |
| | TiO$_2$ | 55 |
| | water | 24 |
| | surfactant | 1 |
| Latex: | "Everflex GT" | 19 |
| | calcium carbonate | 40 |
| | water | 40 |
| | surfactant | 1 |

For comparison, an asbestos fiber, "Calidria RG-244" was added to the above liquids to prepare control samples in the same amount.

These mixtures were stirred at a moderate speed for 10 and a few minutes so as to make them homogeneous.

Then, Thixo-Indices of the mixtures were determined to be:

| | Liquid | | |
|---|---|---|---|
| Thixotopic Agent | Asphalt | Epoxy-resin | Latex |
| Synthetic Pulp | 3.4 | 2.8 | 3.0 |
| Asbestos | 2.4 | 2.0 | 2.5 |

We claim:

1. A method of providing thixotropy to a liquid which comprises adding to the liquid 0.05 to 8 phr of a polyolefin fiber synthetic pulp having a D.F. (Drainage Factor) of 0.03 to 8 second/gramm, F.F. (Floating Factor) of 100 ml or less, an average diameter of 0.1 to 10 micron and a C.F.L. (Classified Fiber Length) of 0.01 to 0.2 mm.

2. A method of providing thixotropy to a liquid which comprises adding to the liquid 0.05 to 8 phr of a polyolefin fiber synthetic pulp having a D.F. (Drainage Factor) of 0.03 to 8 second/gramm, F.F. (Floating Factor) of 100 ml or less, an average diameter of 0.1 to 10 micron and a C.F.L. (Classified Fiber Length) of 0.01 to 0.2 mm, wherein the resulting liquid can be sprayed through a nozzle continuously for a long period of time.

3. The method according to claim 2, wherein the resulting liquid can be sprayed without plugging the nozzle.

4. A method according to claim 1, wherein the liquid is selected from the group consisting of oily and organic materials.

5. A method of providing thixotropy as set forth in claim 2, wherein the liquid is selected from the group consisting of oily and organic materials.

* * * * *